«12» United States Patent
Takase et al.

(10) Patent No.: US 7,084,187 B2
(45) Date of Patent: Aug. 1, 2006

(54) CURABLE LIQUID RESIN COMPOSITION

(75) Inventors: Hideaki Takase, Ibaraki (JP);
Yoshikazu Yamaguchi, Ibaraki (JP);
Takayoshi Tanabe, Umezone (JP)

(73) Assignees: DSM IP Assets B.V., Heerlen (NL);
JSR Corporation, Tokyo (JP); Japan Fine Coatings Co., Ltd., Tokyo (JP)

( * ) Notice: Subject to any disclaimer, the term of this patent is extended or adjusted under 35 U.S.C. 154(b) by 0 days.

(21) Appl. No.: 10/488,472

(22) PCT Filed: Sep. 26, 2002

(86) PCT No.: PCT/NL02/00623

§ 371 (c)(1),
(2), (4) Date: Oct. 25, 2004

(87) PCT Pub. No.: WO03/027191

PCT Pub. Date: Apr. 3, 2003

(65) Prior Publication Data

US 2005/0070623 A1    Mar. 31, 2005

(30) Foreign Application Priority Data

Sep. 27, 2001    (JP) .............................. 2001-296789

(51) Int. Cl.
*C08J 3/28*    (2006.01)
(52) U.S. Cl. .................. 522/153; 522/182; 522/80; 522/84; 522/99; 522/83; 522/79; 522/96; 522/91; 522/178; 522/150; 528/32; 528/26
(58) Field of Classification Search .............. 522/83, 522/79, 94, 96, 91, 182, 80, 84, 99, 178, 522/150, 153; 528/32, 26
See application file for complete search history.

(56) References Cited

U.S. PATENT DOCUMENTS 6,160,067 A * 12/2000 Eriyama et al. ............. 526/279
6,355,703 B1 * 3/2002 Baba et al. ................. 522/182
6,528,604 B1 * 3/2003 Eriyama et al. ............. 526/279
6,646,080 B1 * 11/2003 Chawla et al. .............. 526/240
6,838,536 B1 * 1/2005 Wang et al. ................ 526/240

FOREIGN PATENT DOCUMENTS

WO    97 12942    4/1997

* cited by examiner

*Primary Examiner*—James J. Seidleck
*Assistant Examiner*—Sanza L. McClendon
(74) *Attorney, Agent, or Firm*—Mayer, Brown, Rowe & Maw LLP

(57) ABSTRACT

To provide a radiation-sensitive curable liquid resin composition having excellent applicability and capable of producing a film excelling in hardness, scratch resistance, adhesion, transparency, and appearance of the surface of the film.

A curable liquid resin composition comprising: (A) particles prepared by bonding at least one oxide of an element selected from the group consisting of silicon, aluminum, zirconium, titanium, zinc, germanium, indium, tin, antimony, and cerium to a specific organic compound which comprises a polymerizable unsaturated group and a group shown by —X—C(=Y)—NH— (wherein X is NH, O, or S, and Y is O or S), and preferably a silanol group, (B) a compound having two or more polymerizable unsaturated groups in the molecule, (C) a specific alkylene glycol organic solvent, and preferably (D) a polymerization initiator.

5 Claims, No Drawings

CURABLE LIQUID RESIN COMPOSITION

CROSS REFERENCE TO RELATED APPLICATION

This application is the National Phase of International Application PCT/NL02/00623 filed Sep. 26, 2002 which designated the U.S., and that International Application was published under PCT Article 21(2) in English.

DETAILED DESCRIPTION OF THE INVENTION

1. Field of the Invention

The present invention relates to a curable liquid resin composition exhibiting film formability. The present invention also relates to a curable liquid resin composition capable of being cured by application of heat or radiation. More particularly, the present invention relates to a resin composition exhibiting excellent applicability and film formability, and capable of forming a film excelling in hardness, scratch resistance, adhesion, transparency, and appearance on the surface of various types of substrates such as polyester (polyethyleneterephthalate and polybuthyleneterephthalate), plastics (polycarbonate, triacetyl cellulose, polymethylmethacrylate, polystyrene, polyolefin, epoxy, melamine, ABS resin, AS resin, norbornene resins, metals, wood, paper, glass, and slates. The curable liquid resin composition of the present invention is suitably used as a protective coating material to prevent scratches or stains on plastic optical parts, optical disks such as CD and DVD, touch panels, film-type liquid crystal elements, plastic containers, flooring materials, wall materials, and artificial marbles as interior architectural finish, and the like. The curable liquid resin composition is used as an adhesive and sealing material for substrates and a vehicle material for printing ink.

2. Prior Art

In recent years, a resin composition exhibiting excellent applicability and capable of forming a film excelling in hardness, scratch resistance, adhesion, transparency, and appearance is desired as a protective coating material to prevent scratches or stains on the surface of various substrates. Various types of materials using colloidal silica as component particles have been proposed aiming to improve scratch resistance. For example, U.S. Pat. No. 3,451,838 and U.S. Pat. No. 2,404,357 disclose compositions comprising a hydrolyzate of alkoxysilane and colloidal silica as major components to be used as a heat-curable coating material. Japanese Patent Publication No. 21815/1987 discloses use of a composition containing an acrylate and colloidal silica particles of which the surface is modified by methacryloxysilane as a photocurable coating material. The feature of these coating materials is to improve the performance of the coating materials by treating the surface of silica particles with a specific organic silane or treating under specific conditions. However, these coating materials do not necessarily satisfy excellent applicability as a curable liquid resin composition and provide excellent hardness, scratch resistance, adhesion, transparency, and appearance as a cured film.

Problems to be Solved by the Invention

The present invention has been achieved in view of the above problems. An object of the present invention is to provide a curable liquid resin composition exhibiting excellent applicability and capable of forming a film excelling in hardness, scratch resistance, adhesion, and transparency on the surface of various types of substrates.

Means for Solving the Problems

As a result of extensive studies to achieve the above object, the present inventors have found that all the above characteristics can be satisfied by a curable liquid resin composition comprising (A) crosslinkable particles prepared by bonding oxide particles of a specific element to an organic compound having a specific group, (B) a compound having two or more polymerizable unsaturated groups in the molecule, and (C) an organic solvent having a specific structure. This finding has led to the completion of the present invention. Specifically, the present invention provides a curable liquid resin composition given below.

[1] A curable liquid resin composition comprising: (A) crosslinkable particles prepared by bonding (A1) oxide particles of at least one element selected from the group consisting of silicon, aluminum, zirconium, titanium, zinc, germanium, indium, tin, antimony, and cerium to (A2) a specific organic compound which comprises (A21) a polymerizable unsaturated group and (A22) a group shown by the following formula (1), (B) a compound having (B1) two or more polymerizable unsaturated groups in the molecule, and (C) at least one organic solvent selected from compounds shown by the following formula (2);

$$-X-C(=Y)-NH- \qquad (1)$$

wherein X represents NH, O (oxygen atom), or S (sulfur atom), and Y represents O or S;

$$R^2-(O-R^1)_n-O-R^3 \qquad (2)$$

wherein $R^1$ represents a divalent organic group selected from $-CH_2CH_2-$, $-CH_2CH_2CH_2-$, and $-CH(CH_3)CH_2-$, $R^2$ and $R^3$ represent a hydrogen atom or a monovalent organic group selected from an alkyl group having 1–4 carbon atoms and $CH_3CO-$, and n is 1 or 2.

[2] The curable liquid resin composition according to the above [1], wherein the specific organic compound (A2) comprises a group shown by $-O-C(=O)-NH-$ and at least one of the groups shown by $-O-C(=S)-NH-$ and $-S-C(=O)-NH-$.

[3] The curable liquid resin composition according to the above [1] or [2], wherein the specific organic compound (A2) is a compound having (A23) a silanol group or (A24) a group which forms a silanol group by hydrolysis.

[4] The curable liquid resin composition according to any one of the above [1] to [3], further comprising (D) a polymerization initiator in addition to the components (A), (B), and (C).

[5] The curable liquid resin composition according to any one of the above [1] to [4], wherein the polymerization initiator (D) is (D1) a photoinitiator which comprises at least either an arylketone having a 1-hydroxycyclohexyl group or an arylketone having an N-morpholino group.

In the present invention, "radiation" includes infrared rays, visible rays, ultraviolet rays, deep ultraviolet rays, X-rays, electron beams, α-rays, β-rays, γ-rays, and the like.

PREFERRED EMBODIMENT OF THE INVENTION

A resin composition of the present invention comprises (A) crosslinkable particles prepared by bonding oxide particles of a specific element to an organic compound having a specific group, (B) a compound having two or more polymerizable unsaturated groups in the molecule, (C) an organic solvent having a specific structure, and, optionally, (D) a polymerization initiator.

Each component of the curable liquid resin composition of the present invention is described below in detail.

1. Crosslinkable Particles (A)

The crosslinkable particles (A) used in the present invention are produced by bonding (A1) oxide particles of at least one element selected from the group consisting of silicon, aluminum, zirconium, titanium, zinc, germanium, indium, tin, antimony, and cerium, to (A2) a specific organic compound having (A21) a polymerizable unsaturated group and (A22) a group shown by the above formula (1).

(1) Oxide Particles (A1)

The oxide particles used in the present invention are particles of an oxide of at least one element selected from the group consisting of silicon, aluminum, zirconium, titanium, zinc, germanium, indium, tin, antimony, and cerium from the viewpoint of colorlessness of a cured film of the resulting curable liquid resin composition.

As examples of these oxides, silica, alumina, zirconia, titania, zinc oxide, germanium oxide, indium oxide, tin oxide, indium-tin oxide (ITO), antimony oxide, and cerium oxide can be given. Of these, silica, alumina, zirconia, and antimony oxide are preferable from the viewpoint of high hardness. These oxide particles may be used either individually or in combination of two or more. The oxide particles of these elements are preferably in the form of powder or a solvent dispersion sol. If the oxide particles are in the form of a solvent dispersion sol, an organic solvent is preferably used as a dispersion medium in view of miscibility and dispersibility in other components.

As examples of the organic solvent, alcohols such as methanol, ethanol, isopropanol, butanol, and octanol; ketones such as acetone, methyl ethyl ketone, methyl isobutyl ketone, and cyclohexanone; esters such as ethyl acetate, butyl acetate, ethyl lactate, and γ-butyrolactone; ethers such as ethylene glycol monomethyl ether and diethylene glycol monobutyl ether; aromatic hydrocarbons such as benzene, toluene, and xylene; and amides such as dimethylformamide, dimethylacetamide, and N-methylpyrrolidone can be given. Of these, methanol, isopropanol, butanol, methyl ethyl ketone, methyl isobutyl ketone, ethyl acetate, butyl acetate, toluene, and xylene are preferable.

The number average particle diameter of the oxide particles is preferably from 0.001 to 2 μm, still more preferably from 0.001 to 0.2 μm, and particularly preferably from 0.001 μm to 0.1 μm. If the number average particle diameter is more than 2 μm, transparency of the resulting cured product may be decreased or the surface conditions of the film may be impaired. Various surfactants or amines may be added to the solvent in order to improve dispersibility of the particles.

As examples of commercially available products of silicon oxide particles (silica particles, for example), colloidal silica such as Methanol Silica Sol, IPA-ST, MEK-ST, NBA-ST, XBA-ST, DMAC-ST, ST-UP, ST-OUP, ST-20, ST-40, ST-C, ST-N, ST-O, ST-50, ST-OL (manufactured by Nissan Chemical Industries, Ltd.), and the like can be given. As examples of commercially available products of powdered silica, AEROSIL 130, AEROSIL 300, AEROSIL 380, AEROSIL TT600, and AEROSIL OX50 (manufactured by Japan Aerosil Co., Ltd.), Sildex H31, H32, H51, H52, H121, H122 (manufactured by Asahi Glass Co., Ltd.), E220A, E220 (manufactured by Nippon Silica Industrial Co., Ltd.), SYLYSIA 470 (manufactured by Fuji Silysia Chemical Co., Ltd.), SG Flake (manufactured by Nippon Sheet Glass Co., Ltd.), and the like can be given.

As examples of other commercially available products, aqueous dispersion of alumina such as Alumina Sol-100, 200, 520 (manufactured by Nissan Chemical Industries, Ltd.); isopropanol dispersion of alumina such as AS-150I (manufactured by Sumitomo Osaka Cement Co., Ltd.); toluene dispersion of alumina such as AS-150T (manufactured by Sumitomo Osaka Cement Co., Ltd.); aqueous dispersion of zinc antimonate powder such as Celnax (manufactured by Nissan Chemical Industries, Ltd.); powder and solvent dispersion of alumina, titanium oxide, tin oxide, indium oxide, zinc oxide such as Nano Tek (manufactured by C.I. Kasei Co., Ltd.); aqueous dispersion sol of antimony doped tin oxide such as SN-100D (manufactured by Ishihara Sangyo Kaisha, Ltd.); ITO powder such as a product manufactured by Mitsubishi Material Co., Ltd.; aqueous dispersion of cerium oxide such as Needral (manufactured by Taki Chemical Co., Ltd.), and the like can be given.

The shape of the oxide particles is globular, hollow, porous, rod, plate, fibrous, or amorphous. Of these, a globular shape is preferable. The specific surface area of the oxide particles (measured by a BET method using nitrogen) is preferably from 10 to 1000 m$^2$/g, and still more preferably 100 to 500 m$^2$/g. The oxide particles may be used in the form of dry powder or a dispersion in water or an organic solvent. For example, a dispersion liquid of fine oxide particles known in the art as a solvent dispersion sol of the above oxides may be used. Use of a solvent dispersion sol of the oxide is particularly preferable if high transparency is necessary for the cured product.

(2) Specific Organic Compound (A2)

The specific organic compound used in the present invention has the polymerizable unsaturated group (A21) and the group (A22) shown by the above formula (1) in the molecule. The specific organic compound preferably has a silanol group (A23) or a group (A24) which forms a silanol group by hydrolysis in the molecule.

The specific organic compound (A2) bonds to the oxide particles (A1) at a site other than the polymerizable unsaturated group (A21), and preferably at the silanol group (A23) to form the crosslinkable particles (A). The polymerizable unsaturated group (A21) in the particles provide crosslinking properties to the particles.

(2–1) Polymerizable Unsaturated Group (A21)

There are no specific limitations to the polymerizable unsaturated group included in the specific organic compound. An acryloyl group, methacryloyl group, vinyl group, propenyl group, butadienyl group, styryl group, ethynyl group, cinnamoyl group, maleate group, and acrylamide group can be given as suitable examples.

(2-2) Group (A22) Shown by Formula (1)

The group [—X—C(=Y)—NH—] shown by the formula (1) included in the specific organic compound (A2) is one of [—O—C(=O)—NH—], [—O—C(=S)—NH—], [—S—C(=O)—NH—], [—NH—C(=O)—NH—], [—NH—C(=S)—NH—], and [—S—C(=S)—NH—]. These groups may be used either individually or in combination of two or more. It is preferable to use the group [—O—C(=O)—NH—] and at least one of the groups [—O—C(=S)—NH—] and [—S—C(=O)—NH—] in combination from the viewpoint of thermal stability. It is considered that the group [—X—C(=Y)—NH—] shown by the formula (1) produces a moderate cohesive force between the molecules by a hydrogen bond and provides the resulting cured product with characteristics such as superior mechanical strength, adhesion to substrates, and heat resistance.

(2–3) Silanol Group (A23) or Group (A24) Which forms Silanol Group by Hydrolysis The specific organic compound (A2) is preferably a compound having the silanol group (A23) (hereinafter may be referred to as "silanol group-containing compound") or a compound having the group (A24) which forms a silanol group by hydrolysis (hereinafter may be referred to as "silanol group-forming compound") in the molecule. As examples of the silanol group-forming compound, a compound having an alkoxy group, aryloxy group, acetoxy group, amino group, halogen group, or the like on the silicon atom can be given. Of these, compounds including an alkoxy group or aryloxy group on the silicon atom, specifically, an alkoxysilyl group-containing compound or an aryloxysilyl group-containing compound are preferable.

The silanol group-forming site of the specific organic compound having a silanol group or the group which forms a silanol group is a structural unit which bonds to the oxide particles by condensation or condensation occurring after hydrolysis.

The compound shown by the following formula (3) can be given as a preferable example of (2-4) the specific organic compound (A2):

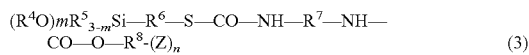

wherein $R^4$ and $R^5$ individually represent a hydrogen atom or an alkyl group or an aryl group having 1–8 carbon atoms such as a methyl group, ethyl group, propyl group, butyl group, octyl group, phenyl group, and xylyl group, and m is 1, 2, or 3.

As examples of the group $[(R^4O)_m R^5_{3-m}Si—]$ in the above formula, a trimethoxysilyl group, triethoxysilyl group, triphenoxysilyl group, methyldimethoxysilyl group, dimethylmethoxysilyl group, and the like can be given. Of these, a trimethoxysilyl group and a triethoxysilyl group are preferable.

$R^6$ is a divalent organic group having an aliphatic structure or an aromatic structure having 1–12 carbon atoms and may include a linear, branched, or cyclic structure. As examples of such an organic group, methylene, ethylene, propylene, butylene, hexamethylene, cyclohexylene, phenylene, xylylene, dodecamethylene, and the like can be given. Of these, methylene, propylene, cyclohexylene, phenylene, and the like are preferable.

$R^7$ is a divalent organic group selected from divalent organic groups having a molecular weight of 14–10,000, and preferably 76–500. As examples of such divalent organic groups, a linear polyalkylene group such as hexamethylene, octamethylene, and dodecamethylene; an alicyclic or polycyclic divalent organic group such as cyclohexylene and norbornylene; a divalent aromatic group such as phenylene, naphthylene, biphenylene, and polyphenylene; and an alkyl group or aryl group substitution product of these groups can be given. These divalent organic groups may include a group having an element other than a carbon atom and a hydrogen atom. These divalent organic groups may include a polyether bond, polyester bond, polyamide bond, polycarbonate bond, and the group shown by the above formula (1).

$R^8$ is an organic group with a valence of (n+1) and preferably selected from linear, branched, or cyclic, saturated or unsaturated hydrocarbon groups.

Z represents a monovalent organic group having a polymerizable unsaturated group in the molecule. As examples of such a monovalent organic group, an acryloyl(oxy) group, methacryloyl(oxy) group, vinyl(oxy) group, propenyl(oxy) group, butadienyl(oxy) group, styryl(oxy) group, ethynyl (oxy) group, cinnamoyl(oxy) group, maleate group, acrylamide group, methacrylamide group, and the like can be given. Of these, an acryloyl(oxy) group and a methacryloyl (oxy) group are preferable. n is an integer preferably from 1 to 20, and more preferably from 1 to 10, and particularly preferably from 1 to 5.

The specific organic compound (A2) used in the present invention may be synthesized by using a method disclosed in Japanese Patent Application Laid-open No. 9-100111, for example. Specifically, the specific organic compound (A2) may be synthesized by an addition reaction of a mercaptoalkoxysilane, a polyisocyanate compound, and an active hydrogen group-containing polymerizable unsaturated compound (method (1)). The specific organic compound (A2) may be synthesized by a direct reaction of a compound having an alkoxysilyl group and an isocyanate group in the molecule with an active hydrogen-containing polymerizable unsaturated compound (method (2)). The specific organic compound (A2) may be synthesized by an addition reaction of a compound having a polymerizable unsaturated group and an isocyanate group in the molecule with mercaptoalkoxysilane or aminosilane (method (3)).

The compound shown by the above formula (3) is preferably synthesized by using the method (a). In more detail, the compound shown by the formula (3) is synthesized by using a method (a) which comprises forming an intermediate compound having an alkoxysilyl group, a group [—S—C (=O)NH—], and an isocyanate group in the molecule by reacting mercaptoalkoxysilane with a polyisocyanate compound, and reacting a hydroxyl group-containing polymerizable unsaturated compound with the isocyanate group remaining in the intermediate compound, thereby causing the unsaturated compound to bond via the group [—S—C (=O)NH—], a method (b) which comprises forming an intermediate compound having a polymerizable unsaturated group, a group [—O—C(=O)—NH—], and an isocyanate group in the molecule by reacting a polyisocyanate compound with a hydroxyl group-containing polymerizable unsaturated compound, and reacting the intermediate compound with mercaptoalkoxysilane, thereby causing mercaptoalkoxysilane to bond via the group [—S—C(=O)— NH—], or the like. Of these two methods, the method (a) is preferred because a decrease in the polymerizable unsaturated group due to the Michael addition reaction does not occur.

As examples of alkoxysilane capable of forming the group [—S—C(=O)—NH—] by the reaction with an isocyanate group in the synthesis of the compound shown by the above formula (3), compounds having at least one alkoxysilyl group and at least one mercapto group in the molecule can be given. As examples of mercaptoalkoxysilane, mercaptopropyltrimethoxysilane, mercaptopropyltriethoxysilane, mercaptopropylmethyldiethoxysilane, mercaptopropyldimethoxymethylsilane, mercaptopropylmethoxydimethylsilane, mercaptopropyltriphenoxysilane, mercaptopropyltributoxysilane, and the like can be given. Of these, mercaptopropyltrimethoxysilane and mercaptopropyltriethoxysilane are preferable. An addition compound of an amino-substituted alkoxysilane and an epoxy group-substituted mercaptan or an addition compound of epoxysilane and α,ω-dimercapto compound may also be used.

The polyisocyanate compound used for synthesizing the specific organic compound may be selected from polyisocyanate compounds consisting of a linear saturated hydrocarbon, cyclic saturated hydrocarbon, or aromatic hydrocarbon.

As examples of such a polyisocyanate compound, 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, bis(2-isocyanatethyl)fumarate, 6-isopropyl-1,3-phenyl diisocyanate, 4-diphenylpropane diisocyanate, lysine diisocyanate, hydrogenated diphenylmethane diisocyanate, 1,3-bis(isocyanatemethyl) cyclohexane, tetramethylxylylene diisocyanate, 2,5(or 6)-bis(isocyanatemethyl)-bicyclo[2.2.1]heptane, and the like can be given. Of these, 2,4-tolylene diisocyanate, isophorone diisocyanate, xylylene diisocyanate, methylenebis(4-cyclohexylisocyanate), 1,3-bis(isocyanatemethyl)cyclohexane, and the like are preferable. These compounds may be used either individually or in combination of two or more.

As examples of the active hydrogen-containing polymerizable unsaturated compound which can be bonded via the group [—O—C(=O)—NH—] by the addition reaction with the polyisocyanate compound used in the synthesis of the specific organic compound, compounds having at least one active hydrogen atom which can form the group [—O—C(=O)—NH—] by the addition reaction with an isocyanate group and at least one polymerizable unsaturated group in the molecule can be given.

As examples of the active hydrogen-containing polymerizable unsaturated compound, 2-hydroxyethyl(meth)acrylate, 2-hydroxypropyl(meth)acrylate, 2-hydroxybutyl(meth)acrylate, 2-hydroxy-3-phenyloxypropyl(meth)acrylate, 1,4-butanediol mono(meth)acrylate, 2-hydroxyalkyl(meth)acryloyl phosphate, 4-hydroxycyclohexyl(meth)acrylate, 1,6-hexanediol mono(meth)acrylate, neopentyl glycol mono(meth)acrylate, trimethylolpropane di(meth)acrylate, trimethylolethane di(meth)acrylate, pentaerythritol tri(meth)acrylate, dipentaerythritol penta(meth)acrylate, and the like can be given. A compound obtained by the addition reaction of a glycidyl group-containing compound such as alkyl glycidyl ether, allyl glycidyl ether, or glycidyl(meth)acrylate and (meth)acrylic acid may also be used. Of these compounds, 2-hydroxyethyl(meth)acrylate, 2-hydroxypropyl(meth)acrylate, pentaerythritol tri(meth)acrylate, and the like are preferable.

These compounds may be used either individually or in combination of two or more.

(3) Preparation of Crosslinkable Particles (A)

There are no specific limitations to the method for preparing the crosslinkable particles (A) used in the present invention. For example, a method of reacting the oxide particles with the specific organic compound can be given. The oxide particles contain moisture on the surface of the particles as adsorbed water under usual storage conditions. It is estimated that a component which reacts with the silanol group-forming compound such as a hydroxide, hydrate, or the like is present at least on the surface of the oxide particles. Therefore, the crosslinkable particles (A) can be prepared by mixing the silanol group-forming compound and oxide particles and heating the mixture while stirring.

The reaction is preferably carried out in the presence of water in order to efficiently cause the silanol group-forming site of the specific organic compound to bond to the oxide particles. However, water need not be present if the specific organic compound has a silanol group. Therefore, the crosslinkable particles (A) may be prepared by a method including at least an operation of mixing the oxide particles and the specific organic compound.

The method for preparing the crosslinkable particles (A) is described below in detail.

The amount of the specific organic compound bonded to the oxide particles in the crosslinkable particles (A) is preferably 0.01 wt % or more, still more preferably 0.1 wt % or more, and particularly preferably 1 wt % or more for 100 wt % of the crosslinkable particles (A) (oxide particles and specific organic compound in total). If the amount of the specific organic compound bonded to the oxide particles is less than 0.01 wt %, dispersibility of the crosslinkable particles (A) in the composition may be insufficient, whereby the resulting cured product has insufficient transparency and scratch resistance. The content of the oxide particles in the raw materials in the preparation of the crosslinkable particles (A) is preferably 5–99 wt %, and more preferably 10–98 wt %.

The method for preparing the crosslinkable particles (A) is described below in more detail taking the alkoxysilyl group-containing compound (alkoxysilane compound) shown by the above formula (3) as an example of the silanol group-forming compound.

The amount of water consumed during hydrolysis of the alkoxysilane compound in the preparation of the crosslinkable particles (A) is determined so that at least one alkoxy group on the silicon atom in the molecule is hydrolyzed. The amount of water added or present during hydrolysis is preferably $\frac{1}{3}$ or more of the number of moles of the total alkoxy groups on the silicon atom, and still more preferably from $\frac{1}{2}$ to 3 times or less of the number of moles of the total alkoxy groups. A product obtained by mixing the alkoxysilane compound and the oxide particles under conditions in which water is completely absent is a product in which the alkoxysilane compound is physically adsorbed on the surface of the oxide particles. A cured product of the composition containing such crosslinkable particles (A) exhibits only low hardness and scratch resistance.

In the preparation of crosslinkable particles (A), a method of separately hydrolyzing the alkoxysilane compound, mixing the hydrolyzate and powder of the oxide particles or a solvent dispersion sol of the oxide particles, and heating the mixture while stirring; a method of hydrolyzing the alkoxysilane compound in the presence of the oxide particles; a method of treating the surface of the oxide particles in the presence of the polymerization initiator (D), or the like may be selectively used. Of these, the method of hydrolyzing the alkoxysilane compound in the presence of the oxide particles is preferable. The crosslinkable particles (A) are prepared at a temperature preferably from 0 to 150° C., and still more preferably from 20 to 100° C. The treating time is usually from five minutes to 24 hours.

In the case of using oxide particles in the form of powder in the preparation of the crosslinkable particles (A), an organic solvent may be added in order to ensure a smooth and homogeneous reaction of the oxide particles and the alkoxysilane compound. A solvent the same as used as the dispersion medium of the solvent dispersion sol of the oxide particles may be used as such an organic solvent. There are no specific limitations to the amount of these solvents insofar as a smooth and homogeneous reaction is ensured.

In the case of using a solvent dispersion sol as the raw material for the crosslinkable particles (A), the crosslinkable particles (A) may be prepared by merely mixing the solvent dispersion sol and the specific organic compound. An organic solvent miscible with water may be added to secure homogeneity at an initial stage of the reaction and promote a smooth reaction.

An acid, salt, or base may be added as a catalyst in the preparation of the crosslinkable particles (A) in order to promote the reaction. As examples of the acid, inorganic acids such as hydrochloric acid, nitric acid, sulfuric acid, and phosphoric acid, organic acids such as methanesulfonic acid, toluenesulfonic acid, phthalic acid, malonic acid, formic acid, acetic acid, and oxalic acid, unsaturated organic acids such as methacrylic acid, acrylic acid, and itaconic acid, and the like can be given. As examples of the salt, ammonium salts such as tetramethylammonium chloride and tetrabutylammonium chloride, and the like can be given. As examples of the base, aqueous ammonia, primary, secondary, or tertiary aliphatic amines such as diethylamine, triethylamine, dibutylamine, and cyclohexylamine, aromatic amines such as pyridine; sodium hydroxide, potassium hydroxide, quaternary ammonium hydroxides such as tetramethylammonium hydroxide, tetrabutylammonium hydroxide, and the like can be given.

Of these, organic acids and unsaturated organic acids are preferable as the acid. As the base, tertiary amines and quaternary ammonium hydroxides are preferable. The amount of the acid, salt, or base is preferably from 0.001 to 1.0 part by weight, and still more preferably from 0.01 to 0.1 part by weight for 100 parts by weight of the alkoxysilane compound.

A dehydrating agent is preferably added in order to promote the reaction. As the dehydrating agent, inorganic compounds such as zeolite, anhydrous silica, and anhydrous alumina, and organic compounds such as methyl orthoformate, ethyl orthoformate, tetraethoxymethane, and tetrabutoxymethane may be used. Of these, organic compounds are preferable. Use of ortho esters such as methyl orthoformate and ethyl orthoformate is particular preferable.

The amount of the alkoxysilane compound bonded to the crosslinkable particles (A) is determined as a constant value of weight loss (%) when dry powder is completely burnt in air by thermogravimetric analysis at a temperature from 110 to 800° C. in air.

The amount of crosslinkable particles (A) in the resin composition is from 5 to 90 wt %, and preferably from 10 to 70 wt % for 100 wt % of the composition (crosslinkable particles (A) and compound (B) in total). If the amount is less than 5 wt %, hardness of the resulting cured product may be insufficient. If the amount exceeds 90 wt %, the composition may not be cured (film may not be formed). The amount of the crosslinkable particles (A) used herein refers to the solid content and does not include the amount of the solvent in the case where the crosslinkable particles (A) are used in the form of a solvent dispersion sol.

2. Compound (B) Having Two or More Polymerizable Unsaturated Groups in the Molecule (Hereinafter May Be Referred to as "Compound (B)")

The compound (B) is suitably used to increase film-formability of the curable liquid resin composition of the present invention. There are no specific limitations to the compound (B) insofar as the compound has two or more polymerizable unsaturated groups. As examples of the compound (B), (meth)acrylates and vinyl compounds can be given. Of these, (meth)acrylates are preferable.

Specific examples of the compound (B) used in the present invention are given below.

As examples of (meth)acrylates, trimethylolpropane tri(meth)acrylate, ditrimethylolpropane tetra(meth)acrylate, pentaerythritol tri(meth)acrylate, pentaerythritol tetra(meth) acrylate, dipentaerythritol penta(meth)acrylate, dipentaerythritol hexa(meth)acrylate, glycerol tri(meth)acrylate, tris(2-hydroxyethyl)isocyanurate tri(meth)acrylate, ethylene glycol di(meth)acrylate, 1,3-butanediol di(meth)acrylate, 1,4-butanediol di(meth)acrylate, 1,6-hexanediol di(meth) acrylate, neopentyl glycol di(meth)acrylate, diethylene glycol di(meth)acrylate, triethylene glycol di(meth)acrylate, dipropylene glycol di(meth)acrylate, bis(2-hydroxyethyl) isocyanurate di(meth)acrylate, poly(meth)acrylates of ethylene oxide or propylene oxide addition product of starting alcohols of these (meth)acrylates, oligoester(meth)acrylates, oligoether(meth)acrylates, oligourethane(meth)acrylates, and oligoepoxy(meth)acrylates having two or more (meth) acryloyl groups in the molecule, and the like can be given. Of these, dipentaerythritol hexa(meth)acrylate, dipentaerythritol penta(meth)acrylate, pentaerythritol tetra(meth) acrylate, and ditrimethylolpropane tetra(meth)acrylate are preferable.

As examples of vinyl compounds, divinylbenzene, ethylene glycol divinyl ether, diethylene glycol divinyl ether, triethylene glycol divinyl ether, and the like can be given.

As examples of commercially available products of the compound (B), Aronix M-400, M-408, M-450, M-305, M-309, M-310, M-315, M-320, M-350, M-360, M-208, M-210, M-215, M-220, M-225, M-233, M-240, M-245, M-260, M-270, M-1100, M-1200, M-1210, M-1310, M-1600, M-221, M-203, TO-924, TO-1270, TO-1231, TO-595, TO-756, TO-1231, TO-1343, TO-902, TO-904, TO-905, TO-1330 (manufactured by Toagosei Co., Ltd.); KAYARAD D-310, D-330, DPHA, DPCA-20, DPCA-30, DPCA-60, DPCA-120, DN-0075, DN-2475, SR-295, SR-355, SR-399E, SR-494, SR-9041, SR-368, SR-415, SR-444, SR-454, SR-492, SR-499, SR-502, SR-9020, SR-9035, SR-111, SR-212, SR-213, SR-230, SR-259, SR-268, SR-272, SR-344, SR-349, SR-601, SR-602, SR-610, SR-9003, PET-30, T-1420, GPO-303, TC-120S, HDDA, NPGDA, TPGDA, PEG400DA, MANDA, HX-220, HX-620, R-551, R-712, R-167, R-526, R-551, R-712, R-604, R-684, TMPTA, THE-330, TPA-320, TPA-330, KS-HDDA, KS-TPGDA, KS-TMPTA (manufactured by Nippon Kayaku Co., Ltd.); Light Acrylate PE-4A, DPE-6A, DTMP-4A (manufactured by Kyoeisha Chemical Co., Ltd.); and the like can be given.

The amount of the compound (B) used in the present invention is preferably from 10 to 95 wt %, and more preferably from 30 to 90 wt % for 100 wt % of the composition (crosslinkable particles (A) and compound (B) in total). If the amount is less than 10 wt %, hardness of the resulting cured product may be insufficient. If the amount exceeds 95 wt %, the cured product may curl to a large extent, whereby problems may occur after forming the film. In addition to the compound (B), a compound having one polymerizable unsaturated group in the molecule may optionally be used in the composition of the present invention.

3. Organic Solvent (C)

The organic solvent (C) used in the present invention is a compound shown by the above formula (2).

As examples of such a solvent, ethylene glycol monomethyl ether, ethylene glycol monoethyl ether, ethylene glycol monopropyl ether, ethylene glycol monobutyl ether, ethylene glycol dimethyl ether, ethylene glycol diethyl ether, ethylene glycol dipropyl ether, ethylene glycol dibutyl ether, diethylene glycol monomethyl ether, diethylene glycol monoethyl ether, diethylene glycol monopropyl ether, diethylene glycol monobutyl ether, diethylene glycol dimethyl ether, diethylene glycol diethyl ether, diethylene glycol dipropyl ether, diethylene glycol dibutyl ether, ethylene glycol methyl ether acetate, ethylene glycol ethyl ether acetate, ethylene glycol propyl ether acetate, ethylene glycol butyl ether acetate, diethylene glycol methyl ether acetate, diethylene glycol ethyl ether acetate, diethylene glycol propyl ether acetate, diethylene glycol butyl ether acetate, ethylene glycol diacetate, diethylene glycol diacetate, propylene glycol monomethyl ether, propylene glycol monoethyl ether, propylene glycol monopropyl ether, propylene glycol monobutyl ether, propylene glycol dimethyl ether, propylene glycol diethyl ether, propylene glycol dipropyl ether, propylene glycol dibutyl ether, dipropylene glycol monomethyl ether, diprdpylene glycol monoethyl ether, dipropylene glycol monopropyl ether, dipropylene glycol monobutyl ether, dipropylene glycol dimethyl ether, dipropylene glycol diethyl ether, dipropylene glycol dipropyl ether, dipropylene glycol dibutyl ether, propylene glycol methyl ether acetate, propylene glycol ethyl ether acetate, propylene glycol propyl ether acetate, propylene glycol butyl ether acetate, dipropylene glycol methyl ether acetate, dipropylene glycol ethyl ether acetate, dipropylene glycol propyl ether acetate, dipropylene glycol butyl ether acetate, propylene glycol diacetate, dipropylene glycol diacetate, 3-methoxy-1-propanol, 3-ethoxy-1-propanol, 3-propoxy-1-propanol, and the like can be given. Of these, ethylene glycol monopropyl ether, ethylene glycol monobutyl ether, propylene glycol monomethyl ether, propylene glycol monoethyl ether, propylene glycol monopropyl ether, propylene glycol monobutyl ether, propylene glycol methyl ether acetate, propylene glycol ethyl ether acetate, and propylene glycol propyl ether acetate are preferable. These compounds may be used either individually or in combination of two or more.

The amount of the organic solvent (C) used in the curable liquid resin composition is preferably from 5 to 9900 parts by weight, still more preferably from 20 to 2000 parts by weight, and particularly preferably from 25 to 1000 parts by weight for 100 parts by weight of the composition (crosslinkable particles (A) and compound (B) in total). If the amount is less than 5 parts by weight, appearance of the film may be impaired. If the amount exceeds 9900 parts by weight, the thickness of the film may be insufficient.

4. Polymerization Initiator (D)

In addition to the crosslinkable particles (A), the compound (B), and the organic solvent (C), the polymerization initiator (D) may optionally be added to the curable liquid resin composition of the present invention. A method of curing the composition of the present invention including the use of the polymerization initiator (D) is described below.

The composition of the present invention is cured by application of heat and/or radiation. In the case of curing the composition by application of heat, an electric heater, infrared ray lamp, hot blast, or the like may be used as a heat source. In the case of curing the composition by application of radiation, there are no specific limitations to the source of radiation insofar as the composition can be cured in a short period of time after application. As an infrared ray source, a lamp, resistance heating plate, laser, and the like can be given. As a visible ray source, sunlight, a lamp, fluorescent lamp, laser, and the like can be given. As a ultraviolet ray source, a mercury lamp, halide lamp, laser, and the like can be given. As a electron beam source, a system of utilizing thermoelectrons produced by a commercially available tungsten filament, a cold cathode method generating electron beams by passing a high voltage pulse through a metal, and a secondary electron method which utilizes secondary electrons produced by collision of ionized gaseous molecules and a metal electrode can be given. As a source of α-rays, β-rays, and γ-rays, fissionable substances such as $Co^{60}$ can be given. As the source of γ-rays, a vacuum tube in which accelerated electrons are allowed to collide with an anode or the like may be utilized. The radiation may be used either individually or in combination of two or more. One or more types of radiation may be irradiated at specific intervals of time.

The polymerization initiator (D) may be added to the composition of the present invention in order to decrease the curing time. As the polymerization initiator (D), conventional compounds which produce active radicals by heat or irradiation can be given.

In the present invention, it is preferable to use (D1) a photoinitiator as the polymerization initiator (D). Use of a photoinitiator (D1) including at least one of an arylketone having a 1-hydroxycyclohexyl group and an arylketone having an N-morpholino group is particularly preferable. If only the arylketone having a 1-hydroxycyclohexyl group is added, a cured product with a small degree of coloration can be formed in a short period of time. If only the arylketone having an N-morpholino group is added, a cured product with high surface hardness can be formed in a short period of time. Combined use of these compounds enables a cured product with a small degree of coloration and high surface hardness to be formed in a short period of time.

There are no specific limitations to the arylketone having a 1-hydroxycyclohexyl group. As examples of the arylketone having a 1-hydroxycyclohexyl group, 1-hydroxycyclohexyl phenyl ketone, 1-hydroxycyclohexyl isopropylphenyl ketone, 1-hydroxycyclohexyldodecyl phenyl ketone, and the like can be given. There are no specific limitations to the arylketone having an N-morpholino group used in the present invention. As examples of the arylketone having an N-morpholino group, 2-methyl-1-[4-(methylthio)phenyl]-2-morpholinopropanone-1, 2-methyl-1-[4-(methoxy)phenyl]-2-morpholinopropanone-1, 2-methyl-1-[4-(2-hydroxyethoxy)phenyl-2-morpholinopropanone-1, 2-methyl-1-[4-(dimethylamino)phenyl-2-morpholinopropanone-1, 2-methyl-1-[4-(diphenylamino)phenyl]-2-morpholinopropanone-1, 2-benzyl-2-dimethylamino-1-(4-morpholinophenyl)-butanone-1, 3,6-bis(2-methyl-2-morpholinopropionyl)-9-N-octylcarbazole, and the like can be given. The photoinitiator (D1) may be used either individually or in combination of two or more. In order to increase the curing speed and hardness of the cured product both in the surface area and inside the product, combined use of the arylketone having a 1-hydroxycyclohexyl group and the arylketone having an N-morpholino group is preferable.

As commercially available products of the photoinitiator (D1), Irgacure 184, 907 (manufactured by Ciba Specialty Chemicals Co., Ltd.), and the like can be given.

The amount of the photoinitiator (D1) optionally used in the composition of the present invention is preferably from 0.01 to 20 wt %, and still more preferably from 0.1 to 10 wt % for 100 wt % of the composition (crosslinkable particles (A) and compound (B) in total). If the amount is less than 0.01 part by weight, hardness of the cured product may be insufficient. If the amount exceeds 20 parts by weight, the inside (inner layer) of the cured product may remain uncured.

In the case of using the arylketone having a 1-hydroxycyclohexyl group and the arylketone having an N-morpholino group in combination, the ratio by weight of the arylketone having a 1-hydroxycyclohexyl group to the arylketone having an N-morpholino group is preferably from 10:90 to 90:10, and still more preferably from 40:60 to 80:20.

5. Other Components

Various types of components such as photosensitizers, oxide particles other than the crosslinkable particles (A), and additives may optionally be added to the composition of the present invention. Examples of these components are given below.

(1) Sensitizer

As examples of sensitizers, triethylamine, diethylamine, N-methyldiethanoleamine, ethanolamine, 4-dimethylaminobenzoic acid, methyl 4-dimethylaminobenzoate, ethyl 4-dimethylaminobenzoate, isoamyl 4-dimethylaminobenzoate, and the like can be given. As commercially available products of sensitizers, KAYACURE DMBI, EPA (manufactured by Nippon Kayaku Co., Ltd.), and the like can be given.

(2) Oxide Particles Other Than Crosslinkable Particles (A)

As examples of oxide particles other than the crosslinkable particles (A), oxide particles which are not bonded to the specific organic compound and the like can be given.

(3) Additive

As examples of additives, antioxidants, UV absorbers, light stabilizers, silane coupling agents, aging preventives, thermal polymerization inhibitors, coloring agents, leveling agents, surfactants, preservatives, plasticizers, lubricants, inorganic fillers, organic fillers, wettability improvers, coating surface improvers, and the like can be given.

As commercially available products of antioxidants, Irganox 1010, 1035, 1076, 1222 (manufactured by Ciba Specialty Chemicals Co., Ltd.) and the like can be given. As commercially available products of UV absorbers, Tinuvin P, 234, 320, 326, 327, 328, 213, 400 (manufactured by Ciba Specialty Chemicals Co., Ltd.), Sumisorb 110, 130, 140, 220, 250, 300, 320, 340, 350, 400 (manufactured by Sumitomo Chemical Industries Co., Ltd.), and the like can be given. As commercially available products of light stabilizers, Tinuvin 292, 144, 622LD (manufactured by Ciba Specialty Chemicals Co., Ltd.), Sanol LS 770, 765, 292, 2626, 1114, 744 (manufactured by Sankyo Kasei Co., Ltd.), and the like can be given. As examples of silane coupling agents, γ-aminopropyltriethoxysilane, γ-mercaptopropyltrimethoxysilane, γ-methacryloxypropyltrimethoxysilane, commercially available products such as SH6062, SZ6030 (manufactured by Toray-Dow Corning Silicone Co., Ltd.), KBE 903, KBM803 (manufactured by Shin-Etsu Silicone Co., Ltd.), and the like can be given.

As examples of aging preventives, Antigen W, S, P, 3C, 6C, RD-G, FR, AW (manufactured by Sumitomo Chemical Co., Ltd.), and the like can be given.

(4) Other Additives

As examples of other additives, polymers and oligomers such as epoxy resins, polymerizable compounds such as urethane (meth)acrylate, vinyl ether, propenyl ether, and maleic acid derivatives, polyamide, polyimide, polyamideimide, polyurethane, polybutadiene, chloroprene, polyether, polyester, pentadiene derivatives, styrene/butadiene/styrene block copolymer, styrene/ethylene/butene/styrene block copolymer, styrene/isoprene/styrene block copolymer, petroleum resins, xylene resin, ketone resin, fluorine-containing oligomer, silicone oligomer, and polysulfide oligomer, and the like can be given.

The curable liquid resin composition of the present invention is suitable as a coating material. As examples of substrates to which the composition is applied, plastics (polycarbonate, polymethacrylate, polystyrene, polyester, polyolefin, epoxy, melamine, triacetyl cellulose, ABS resin, AS resin, norbornene resin, etc.), metals, wood, paper, glass, slates, and the like can be given. The substrate may be in the shape of a plate, film, or three-dimensional formed product. As a coating method, conventional coating methods such as dip coating, spray coating, flow coating, shower coating, roll coating, spin coating, and brush coating may be employed. The thickness of the film after drying and curing is usually from 0.1 to 400 μm, and preferably from 1 to 200 μm.

The curable liquid resin composition of the present invention may be diluted with a solvent in order to adjust the thickness of the film. In the case where the curable liquid resin composition is used as a coating material, viscosity of the composition is usually from 0.1 to 50,000 mPa.s/25° C., and preferably from 0.5 to 10,000 mPa.s/25° C.

A cured product is obtained by applying the curable liquid resin composition of the present invention to various substrates such as a plastic substrate and curing the composition. Specifically, the cured product is obtained as a coated formed product by applying the composition to the substrate, drying volatile components at a temperature preferably from 20 to 200° C., and curing the composition by application of heat and/or radiation. Curing by application of heat is preferably performed at 40–150° C. for 10 seconds to 24 hours. As radiation, use of ultraviolet rays or electron beams is preferable. The dose of ultraviolet rays is preferably from 0.01–10 $J/cm^2$, and still more preferably from 0.1 to 2 $J/cm^2$. Preferable irradiation conditions for electron beams are at an applied voltage of 10–300 KV, an electron density of 0.02–0.30 $mA/cm^2$ and a dose of 1–10 Mrad.

The cured product of the curable liquid resin composition of the present invention excels in hardness, scratch resistance, adhesion, transparency, and appearance of the film. Therefore, the cured product is suitable for use as a protective coating material to prevent scratches or stains on plastic optical parts, optical disks such as a CD and DVD, touch panels, film-type liquid crystal elements, plastic containers, or flooring materials, wall materials, and artificial marbles which are used for architectural interior finish; an adhesive and a sealing material for various substrates; vehicles for printing ink; and the like. The cured product is particularly suitably used for various plastic films for optics such as optical disks such as CD and DVD, liquid crystal elements, and the surface of a PDP, for which a scratch prevention protective coating excelling in transparency is demanded.

EXAMPLES

The present invention is described below in more detail by examples. However, the present invention is not limited to the examples. In the examples, "part" and "%" respectively refer to "part by weight" and "wt %" unless otherwise indicated.

In the present invention, "solid content"refers to the content of components after removing volatile components such as a solvent from the composition. Specifically, the solid content refers to the content of a residue (nonvolatile components) obtained by drying the composition on a hot plate at 120° C. for one hour.

Synthesis of Organic Compound (A2)

Synthesis Example 1

20.6 parts of isophorone diisocyanate was added dropwise to a solution of 7.8 parts of mercaptopropyltrimethoxysilane and 0.2 part of dibutyltin dilaurate while stirring at 50° C. for one hour in dry air. The mixture was stirred at 60° C. for three hours. After the addition of 71.4 parts of pentaerythritol triacylate dropwise to the mixture at 30° C. for one hour, the mixture was stirred at 60° C. for three hours to obtain an organic compound (A2–1). In an infrared absorption spectrum of the product, the absorption peak at 2550 kayser characteristic to a mercapto group and the absorption peak at 2260 kayser characteristic to an isocyanate group in the raw material disappeared, and the absorption peak at 1660 kayser characteristic to a [—O—C(=O)—NH—] group and a [—S—C(=O)—NH—] group and the absorption peak at 1720 kayser characteristic to an acryloyl group appeared. This indicates that an organic compound having an acryloyl group, [—O—C(=O)—NH—] group, and [—S—C(=O)—NH—] group as polymerizable unsaturated groups was produced.

Preparation of Crosslinkable Particles (A)

Preparation Example 1

A mixture of 8.7 parts of the organic compound (A2-1) synthesized in Synthesis Example 1, 91.3 parts of methyl ethyl ketone silica sol (MEK-ST, manufactured by Nissan Chemical Industries, Ltd., number average particle diameter: 0.022 µm, silica concentration: 30%), 0.2 part of isopropanol, and 0.1 part of ion exchanged water was stirred at 80° C. for three hours in a nitrogen stream. After the addition of 1.4 parts of methyl orthoformate, the mixture was stirred at 80° C. for one hour to obtain a colorless transparent dispersion liquid of crosslinkable particles (A-1). 2 g of the dispersion liquid was weighed on an aluminum dish and dried at 120° C. for one hour on a hot plate. The solid content determined by weighing the dried product was 35%.

Preparation Example 2

A mixture of 8.2 parts of the organic compound (A2-1) synthesized in Synthesis Example 1, 91.8 parts of methyl ethyl ketone zirconia sol (number average particle diameter: 0.01 µm, zirconia concentration: 30%), and 0.1 part of ion-exchanged water was stirred at 60° C. for three hours. After the addition of 1.3 parts of methyl orthoformate, the mixture was stirred at 60° C. for one hour to obtain a dispersion liquid of crosslinkable particles (A-2). The solid content of the dispersion liquid determined in the same manner as in Preparation Example 1 was 35%.

Preparation Example 3

A mixture of 8.2 parts of the organic compound (A2-1) synthesized in Synthesis Example 1, 91.8 parts of propylene glycol methyl ether acetate zirconia sol (number average particle diameter: 0.01 µm, zirconia concentration: 30%), and 0.1 part of ion exchanged water was stirred at 60° C. for three hours. After the addition of 1.3 parts of methyl orthoformate, the mixture was stirred at 60° C. for one hour to obtain a dispersion liquid of crosslinkable particles (A-3). The solid content of the dispersion liquid determined in the same manner as in Preparation Example 1 was 35%.

The data for Preparation Examples 1 to 3 in which the crosslinkable particles (A-1) to (A-3) were prepared is shown in Table 1.

TABLE 1

| Preparation Example | 1 | 2 | 3 |
|---|---|---|---|
| Crosslinkable particles | A-1 | A-2 | A-3 |
| Organic compound | | | |
| A2-1 | 8.7 | 8.2 | 8.2 |
| Oxide particle sol | | | |
| A1-1 | 91.3 | | |
| A1-2 | | 91.8 | |
| A1-3 | | | 91.8 |
| Ion exchanged water | 0.1 | 0.1 | 0.1 |
| Isopropanol | 0.2 | — | — |
| Methyl orthoformate | 1.4 | 1.3 | 1.3 |
| Solid content (%) | 35 | 35 | 35 |
| Content of oxide particles in raw materials | 79 | 77 | 77 |

Explanation of Symbols in Table 1:

A1-1: Methyl ethyl ketone silica sol (oxide concentration: 30%)

A1-2: Methyl ethyl ketone zirconia sol (oxide concentration: 30%)

A1-3: Propylene glycol ethyl ether acetate zirconia sol (oxide concentration: 30%)

Preparation of Composition

Examples 1 to 4 and Comparative Examples 1 to 3 illustrate preparation examples of the curable liquid resin composition of the present invention. The weight ratio of each component is shown in Table 2.

Example 1

140 parts of the dispersion liquid prepared in Preparation Example 1 (content of crosslinkable particles (A-1): 49 parts, dispersion medium: methyl ethyl ketone), 46 parts of dipentaerythritol hexaacrylate, and 100 parts of propylene glycol monomethyl ether were mixed in a container shaded from ultraviolet rays in a dry air stream. The mixture was concentrated under reduced pressure using a rotary evaporator until the amount of liquid was 195 parts. After the addition of 3 parts of 1-hydroxycyclohexyl phenyl ketone and 2 parts of 2-methyl-1-(4-(methylthio)phenyl)-2-morpholinopropanone-1, the mixture was stirred at 50° C. for one hour to obtain 200 parts of a homogeneous curable liquid resin composition solution. 2 g of the composition was weighed on an aluminum dish and dried at 120° C. for one hour on a hot plate. The solid content determined by weighing the dried product was 50%. Therefore, the solvent was contained in an amount of 100 parts. The solvent was determined by using gas chromatography. As a result, propylene glycol monomethyl ether and methyl ethyl ketone were present at a weight ratio of 90:10. The amount of propylene glycol monomethyl ether and methyl ethyl ketone in the composition calculated from the results was 90 parts by weight and 10 parts by weight, respectively.

Example 2

229 parts of the dispersion liquid prepared in Preparation Example 2 (content of crosslinkable particles (A-2): 80 parts, dispersion medium: methyl ethyl ketone), 18 parts of pentaerythritol tetraacrylate, and 96 parts of ethylene glycol monobutyl ether were mixed in a container shaded from ultraviolet rays in a dry air stream. The mixture was concentrated under reduced pressure using a rotary evaporator until the amount of liquid was 194 parts. After the addition of 1 part of 1-hydroxycyclohexyl phenyl ketone and 1 part of 2-methyl-1-(4-(methylthio)phenyl)-2-morpholinopropanone-1, the mixture was stirred at 50° C. for one hour to obtain a homogeneous composition solution. The solid content of the composition and the solvent and the weight ratio of the solvent were determined in the same manner as in Example 1. As a result, the solid content was 51% and the solvent was contained in an amount of 96 parts. The solvent was determined by analysis in the same manner as in Example 1. As a result, ethylene glycol monobutyl ether and methyl ethyl ketone were present at a weight ratio of 95:5. The amount of ethylene glycol monobutyl ether and methyl ethyl ketone in the composition calculated from the results was 91 parts by weight and 5 parts by weight, respectively.

Example 3

A composition of the present invention was prepared in the same manner as in Example 2 except for using propylene glycol monopropyl ether instead of ethylene glycol monobutyl ether. The solid content of the composition and the solvent and the weight ratio of the solvent were determined in the same manner as in Example 1. As a result, the solid content was 51% and the solvent was contained in an amount of 96 parts. The solvent was determined by analysis in the same manner as in Example 1. As a result, propylene glycol monopropyl ether and methyl ethyl ketone were present at a weight ratio of 95:5. The amount of propylene glycol monopropyl ether and methyl ethyl ketone in the composition calculated from the results was 91 parts by weight and 5 parts by weight, respectively.

Example 4

229 parts of the dispersion liquid prepared in Preparation Example 3 (content of crosslinkable particles (A-3): 80 parts, dispersion medium: propylene glycol monomethyl ether acetate) and 18 parts of pentaerythritol tetraacrylate were mixed in a container shaded from ultraviolet rays in a dry air stream. The mixture was concentrated under reduced pressure using a rotary evaporator until the amount of liquid was 194 parts. After the addition of 1 part of 1-hydroxycyclohexyl phenyl ketone and 1 part of 2-methyl-1-(4-(methylthio)phenyl)-2-morpholinopropanone-1, the mixture was stirred at 50° C. for one hour to obtain a homogeneous composition solution of the present invention. The solid content of the composition and the solvent and the weight ratio of the solvent were determined in the same manner as in Example 1. As a result, the solid content was 51% and the solvent was contained in an amount of 96 parts. The solvent contained only propylene glycol methyl ether acetate.

Comparative Example 1

A curable liquid resin composition was prepared in the same manner as in Example 1 except for using toluene as an organic solvent instead of propylene glycol monomethyl ether. The solid content of the composition and the solvent and the weight ratio of the solvent were determined in the same manner as in Example 1. As a result, the solid content was 50% and the solvent was contained in an amount of 100 parts. The solvent was determined by analysis in the same manner as in Example 1. As a result, toluene and methyl ethyl ketone were present at a weight ratio of 90:10. The amount of toluene and methyl ethyl ketone in the composition calculated from the results was 90 parts by weight and 10 parts by weight, respectively.

Comparative Example 2

A curable liquid resin composition was prepared in the same manner as in Example 2 except for using 2-octanone as an organic solvent instead of ethylene glycol monobutyl ether. The solid content of the composition and the solvent and the weight ratio of the solvent were determined in the same manner as in Example 1. As a result, the solid content was 51% and the solvent was contained in an amount of 96 parts. The solvent was determined by analysis in the same manner as in Example 1. As a result, methyl ethyl ketone and 2-octanone were present at a weight ratio of 5:95. The amount of methyl ethyl ketone and 2-octanone in the composition calculated from the results was 5 parts by weight and 91 parts by weight, respectively.

Comparative Example 3

A curable liquid resin composition was prepared in the same manner as in Example 2 except for using cyclohexanone as an organic solvent instead of ethylene glycol monobutyl ether. The solid content of the composition and the solvent and the weight ratio of the solvent were determined in the same manner as in Example 1. As a result, the solid content was 51% and the solvent was contained in an amount of 96 parts. The solvent was determined by analysis in the same manner as in Example 1. As a result, methyl ethyl ketone and cyclohexanone were present at a weight ratio of 5:95. The amount of methyl ethyl ketone and cyclohexanone in the composition calculated from the results was 5 parts by weight and 91 parts by weight, respectively.

Evaluation of Cured Product

In order to demonstrate the effects of the composition of the present invention, a cured product obtained by applying the composition, drying the applied composition, and irradiating the dried product was evaluated. The evaluation methods are described below. The evaluation results are shown in Table 2.

1. Conditions for Application, Drying, and Curing

In Examples 1 to 4 and Comparative Examples 1 to 3 shown in Table 2, the composition was applied to a substrate using a bar coater so that the thickness was 10 μm after drying, dried at 80° C. for three minutes in a hot blast oven, irradiated at a dose of 1 J/cm² using a conveyer-type mercury lamp, and stored at 25° C. for 24 hours before the evaluation. The application conditions for a wind ripple pattern test and a streak test are described later.

2. Substrate

A glass plate was used in a pencil hardness test. A polyethyleneterephthalate (PET) film with a thickness of 188 μm was used in evaluation of steel wool scratch resistance, adhesion, the wind ripple test, and the streak test.

3. Evaluation Method

Pencil Hardness:

A film cured on a glass substrate was evaluated according to JIS K5400.

Adhesion (%):

According to a cellophane tape cross-cut peeling test described in JIS K5400, adhesion was evaluated by the percentage of the number of 1×1 mm squares remaining among 100 squares.

Steel Wool (SW) Scratch Resistance:

A Gakushin-type abrasion resistance tester (manufactured by Tester Sangyo Co., Ltd.) was reciprocated on a film 30 times using #0000 steel wool to which a load of 500 g was applied. SW scratch resistance was evaluated by observing scratch conditions on the surface of the film with the naked eye. A case where no scratch was observed was evaluated as "Good", a case where 1–10 scratches were observed was evaluated as "Fair", and a case where more than 10 scratches were observed was evaluated as "Bad".

Transparency:

Transparency was evaluated by naked eye observation. Transparency was evaluated as "Good" or "Bad".

Film Uniformity Test:

4 cc of the curable liquid resin composition was applied dropwise to a silicon wafer (six inches) while rotating the wafer at 50 rpm. The composition was applied at 700 rpm for 20 seconds and dried at 80° C. for three minutes in a hot blast oven. The dried product was irradiated at a dose of 1 J/cm$^2$ using a conveyer-type mercury lamp to obtain a cured film. The degree of unevenness of the film was observed with the naked eye. A case where reflection of light on the surface of the film was uniform and no abnormalities were observed in the film was evaluated as "Good", and a case where reflection of light on the surface of the film was nonuniform and an interference pattern was observed or a case where one or more foreign materials were present on the film or abnormalities such as uneven coating or crawling were observed was evaluated as "Bad".

Wind Ripple Pattern Test:

The curable liquid resin composition was applied to a PET film using a bar coater so that the thickness after drying was 10 μm. A current of air was blown against the surface of the applied composition for two minutes using a cooling fan (velocity: 5 m/sec.). After drying the composition at 80° C. for three minutes in a hot blast oven, the composition was irradiated at a dose of 1 J/cm$^2$ using a conveyer-type mercury lamp to obtain a cured film. The degree of unevenness of the film was observed with the naked eye. A case where reflection of light on the surface of the film was uniform and no abnormalities were observed in the film was evaluated as "Good", and a case where reflection of light on the surface of the film was nonuniform or a case where one or more foreign materials were present on the film or abnormalities such as uneven coating or crawling were observed was evaluated as "Bad".

Streak Test:

1 ml of the curable liquid resin composition was applied dropwise to a PET film at a width of 10 cm. After allowing to stand at room temperature for two minutes, the composition was applied using a bar coater so that the thickness after drying was 10 pm and dried at 80° C. for three minutes in a hot blast oven. The dried product was irradiated at a dose of 1 J/cm$^2$ using a conveyer-type mercury lamp to obtain a cured film. The degree of unevenness of the film were observed with the naked eye. A case where no traces of the bar coater was observed on the film was evaluated as "Good", a case where the trace of the bar coater was 1 cm to 3 cm or less was evaluated as "Fair", and a case where the trace of the bar coater was more than 3 cm was evaluated as "Bad".

TABLE 2

| | Example | | | | Comparative Example | | |
|---|---|---|---|---|---|---|---|
| | 1 | 2 | 3 | 4 | 1 | 2 | 3 |
| Crosslinkable particles (A) | | | | | | | |
| A-1 | 49 | | | | 49 | | |
| A-2 | | 80 | 80 | | | 80 | 80 |
| A-3 | | | | 80 | | | |
| Acrylate | | | | | | | |
| M1 | 46 | | | | 46 | | |
| M2 | | 18 | 18 | 18 | | 18 | 18 |
| Photoinitiator | | | | | | | |
| R1 | 3 | 1 | 1 | 1 | 3 | 1 | 1 |
| R2 | 2 | 1 | 1 | 1 | 2 | 1 | 1 |
| Organic solvent (boiling point, ° C.) | | | | | | | |
| Methyl ethyl ketone (80) | 10 | 5 | 5 | | 10 | 5 | 5 |
| PGMME (120) | 90 | | | | | | |
| EGMBE (170) | | 91 | | | | | |
| PGMPE (150) | | | 91 | | | | |
| PGMEA (146) | | | | 96 | | | |
| Toluene (111) | | | | | 90 | | |
| 2-Octanone (173) | | | | | | 91 | |
| Cyclohexanone (156) | | | | | | | 91 |
| Total | 200 | 196 | 196 | 196 | 200 | 196 | 196 |
| Solid content (%) | 50 | 51 | 51 | 51 | 50 | 51 | 51 |
| Properties of cured product | | | | | | | |
| Pencil hardness | 8H | 8H | 8H | 8H | 8H | 8H | 8H |
| Adhesion (%) | 100 | 100 | 100 | 100 | 100 | 100 | 100 |
| SW scratch resistance | Good | Good | Good | Good | Good | Good | Good |
| Transparency | Good | Good | Good | Good | Good | Good | Good |
| Applicability | | | | | | | |
| Film uniformity | Good | Good | Good | Good | Bad | Bad | Bad |
| Wind ripple | Good | Good | Good | Good | Bad | Bad | Fair |
| Streak | Good | Good | Good | Good | Fair | Fair | Fair |

Explanation of Symbols in Table 2:

A-1, A-2, A-3: value of crosslinkable particles (A) is solid content (part by weight) of crosslinkable particles in dispersion liquid M1: Dipentaerythritol hexaacrylate M2: Pentaerythritol tetraacrylate R1: 1-Hydroxycyclohexyl phenyl ketone R2: 2-Methyl-1-[4-(methylthio)phenyl]-2-morpholinopropanone-1

PGMME: Propylene glycol monomethyl ether

EGMBE: Ethylene glycol monobutyl ether

PGMPE: Propylene glycol monopropyl ether

PGMEA: Propylene glycol methyl ether acetate

The unit for the values of each component in Table 2 is part by weight.

As is clear from data in Table 2, pencil hardness, adhesion, steel wool scratch resistance, and transparency of the cured products of the curable liquid resin compositions were good. Applicability of the curable liquid resin compositions of the present invention in Examples 1 to 4 was evaluated as "Good" in the film uniformity test, wind ripple pattern test, and streak test. However, applicability of the compositions in Comparative Examples 1 to 3 were evaluated as "Bad" or "Fair" in these tests.

Effect of the Invention

As described above, the present invention can provide a curable liquid resin composition having excellent applicability and capable of producing a film excelling in hardness, scratch resistance, adhesion, transparency, and appearance of the surface of the film.

The invention claimed is:

1. A curable liquid resin composition comprising: (A) crosslinkable particles prepared by bonding oxide particles of at least one element selected from the group consisting of silicon, aluminum, zirconium, titanium, zinc, germanium, indium, tin, antimony, and cerium to a specific organic compound which comprises a polymerizable unsaturated group and a group shown by the following formula (1), (B) a compound having two or more polymerizable unsaturated groups in the molecule, and (C) at least one organic solvent selected from compounds shown by the following formula (2);

$$-X-C(=Y)-NH- \qquad (1)$$

wherein X represents NH, O (oxygen atom), or S (sulfur atom), and Y represents O or S;

$$R^2-(O-R^1)_n-O-R^3 \qquad (2)$$

wherein $R^1$ represents a divalent organic group selected from $-CH_2CH2-$, $-CH_2CH_2CH_2-$, and $-CH(CH_3)CH_2-$, $R^2$ and $R^3$ represent a hydrogen atom or a monovalent organic group selected from an alkyl group having 1–4 carbon atoms and $CH_3CH-$, and n is 1 or 2, with the proviso that when n=1 and $R^3$ has 1 carbon atom, $R^2$ is not H.

2. The curable liquid resin composition according to claim 1, wherein the specific organic compound comprises a group shown by $-O-C(=O)-NH-$ and at least one of the groups shown by $-O-C(=S)-NH-$ and $-S-C(=O)-NH-$.

3. The curable liquid resin composition according to claim 1, wherein the specific organic compound is a compound having a silanol group or a group which forms a silanol group by hydrolysis.

4. The curable liquid resin composition according to claim 1, further comprising (D) a polymerization initiator in addition to the components (A), (B), and (C).

5. The curable liquid resin composition according to claim 4, wherein the polymerization initiator (D) is a photoinitiator which comprises at least either an arylketone having a 1-hydroxycyclohexyl group or an arylketone having an N-morpholino group.

* * * * *